(12) United States Patent
Imoto et al.

(10) Patent No.: US 9,127,114 B2
(45) Date of Patent: *Sep. 8, 2015

(54) CURABLE FLUORINE-CONTAINING POLYMER COMPOSITION

(75) Inventors: Katsuhiko Imoto, Settsu (JP); Tetsuo Shimizu, Settsu (JP); Tatsuya Morikawa, Settsu (JP); Masayuki Hayashi, Ichihara (JP); Tomohiro Iimura, Ichihara (JP); Peter Cheshire Hupfield, Wales (GB)

(73) Assignees: DAIKIN INDUSTRIES, LTD., Osaka (JP); DOW CORNING CORPORATION, Midland, MI (US)

( * ) Notice: Subject to any disclaimer, the term of this patent is extended or adjusted under 35 U.S.C. 154(b) by 169 days.

This patent is subject to a terminal disclaimer.

(21) Appl. No.: 12/445,354

(22) PCT Filed: Oct. 12, 2007

(86) PCT No.: PCT/JP2007/069941
§ 371 (c)(1),
(2), (4) Date: Jul. 21, 2009

(87) PCT Pub. No.: WO2008/044765
PCT Pub. Date: Apr. 17, 2008

(65) Prior Publication Data
US 2010/0113700 A1    May 6, 2010

(30) Foreign Application Priority Data

Oct. 12, 2006   (JP) .................. 2006-279147

(51) Int. Cl.
| | | |
|---|---|---|
| *C08G 18/81* | (2006.01) | |
| *C09D 127/18* | (2006.01) | |
| *C09D 127/12* | (2006.01) | |
| *C09D 127/20* | (2006.01) | |
| *C08G 18/62* | (2006.01) | |
| *C08G 77/442* | (2006.01) | |
| *C08L 83/04* | (2006.01) | |
| *C09D 131/02* | (2006.01) | |
| *C08G 77/04* | (2006.01) | |
| *C08G 77/12* | (2006.01) | |
| *C08K 5/5419* | (2006.01) | |
| *C08L 27/12* | (2006.01) | |
| *C08L 31/02* | (2006.01) | |

(52) U.S. Cl.
CPC ........ *C08G 18/8108* (2013.01); *C08G 18/6279* (2013.01); *C08G 77/442* (2013.01); *C08L 83/04* (2013.01); *C09D 127/12* (2013.01); *C09D 127/18* (2013.01); *C09D 127/20* (2013.01); *C09D 131/02* (2013.01); *C08G 77/045* (2013.01); *C08G 77/12* (2013.01); *C08K 5/5419* (2013.01); *C08L 27/12* (2013.01); *C08L 31/02* (2013.01)

(58) Field of Classification Search
CPC  C08G 18/6279; C08G 18/8108; C08L 31/02; C09D 131/02; C09D 127/20
USPC ........... 525/104; 526/249, 254, 255; 556/437, 556/451, 487
See application file for complete search history.

(56) References Cited

U.S. PATENT DOCUMENTS

| | | | | |
|---|---|---|---|---|
| 2,877,255 | A * | 3/1959 | Clark ........................... | 556/451 |
| 3,377,371 | A * | 4/1968 | Quaal ........................... | 556/440 |
| 5,554,689 | A | 9/1996 | Langstein et al. | |
| 5,837,774 | A | 11/1998 | Tarumi et al. | |
| 6,518,371 | B1 * | 2/2003 | Fink et al. ...................... | 525/478 |
| 6,930,147 | B1 * | 8/2005 | Nakagawa et al. ............ | 525/104 |
| 2003/0166795 | A1 | 9/2003 | Hasegawa et al. | |
| 2005/0038187 | A1 * | 2/2005 | Mano et al. ................... | 525/101 |
| 2006/0052546 | A1 | 3/2006 | Morikawa et al. | |
| 2006/0052558 | A1 * | 3/2006 | Morikawa et al. ............ | 526/247 |

FOREIGN PATENT DOCUMENTS

| | | |
|---|---|---|
| CN | 1398280 A | 2/2003 |
| EP | 0582841 A1 | 2/1994 |
| EP | 639606 A1 * | 2/1995 |
| EP | 1081192 A1 | 3/2001 |
| EP | 1460091 A1 | 9/2004 |
| EP | 1820809 A1 * | 8/2007 |
| JP | 06-192524 A | 7/1994 |

(Continued)

*Primary Examiner* — Nicole M Buie-Hatcher
(74) *Attorney, Agent, or Firm* — Sughrue Mion, PLLC

(57) ABSTRACT

There is provided a curable fluorine-containing polymer composition which is quickly cured at relatively low temperatures by hydrosilylation reaction and provides a coating film which has high hardness, excellent solvent resistance and flexibility. The curable fluorine-containing polymer composition comprises a fluorine-containing polymer comprising a fluorinated ethylenic monomer unit and a non-fluorinated ethylenic monomer unit, in which a part or the whole of the non-fluorinated ethylenic monomer units is a unit represented by the formula:

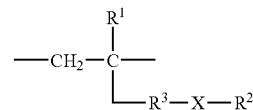

wherein $R^1$ is hydrogen or methyl; $R^2$ is a hydrocarbon group having ethylenic C=C; X is —C(O)NH— or —C(O)—; $R^3$ is —O—, —O[CH($R^4$)]$_m$O—, —(CH$_2$)$_m$O—, —OC(O)(CH$_2$)$_m$O— or —(CH$_2$)$_m$OC(O)—(CH$_2$)$_n$O—, where $R^4$ is —H, —OH, —CH$_2$OH or —O—X—$R^2$, a siloxane compound having hydrogen atom bonded to silicon atom, and a catalyst for hydrosilylation reaction.

6 Claims, No Drawings

(56) References Cited

FOREIGN PATENT DOCUMENTS

| | | |
|---|---|---|
| JP | 2001-26674 A | 1/2001 |
| JP | 2006-002075 A | 1/2006 |
| WO | 01/59011 A1 | 8/2001 |
| WO | 01/81474 A1 | 11/2001 |
| WO | 03/076484 A1 | 9/2003 |
| WO | 2004/050758 A1 | 6/2004 |
| WO | 2005/059028 A2 | 6/2005 |

* cited by examiner

US 9,127,114 B2

CURABLE FLUORINE-CONTAINING POLYMER COMPOSITION

TECHNICAL FIELD

The present invention relates to a curable fluorine-containing polymer composition which is cured by hydrosilylation reaction.

BACKGROUND ART

Curable fluorine-containing polymer compositions comprising a fluorine-containing polymer having hydroxyl group and prepared by copolymerizing a fluorinated ethylenic monomer and a non-fluorinated ethylenic monomer (a part or the whole of the non-fluorinated ethylenic monomer is a non-fluorinated ethylenic monomer having hydroxyl group) and a curing agent such as isocyanates, amino resins, acid anhydrides, polyepoxy compounds or isocyanate group-containing silane compounds are known compositions. However, these curable fluorine-containing polymer compositions have a problem that it takes time for curing and the compositions must be heated to high temperature.

JP6-192524A proposes a curable fluorine-containing polymer composition comprising a fluorine-containing polymer having alkenyl groups and prepared by copolymerizing a fluorinated ethylenic monomer, a non-fluorinated ethylenic monomer and a monomer having at least two alkenyl groups such as triallyl isocyanurate, an organopolysiloxane having hydrogen atom bonded to silicon atom, and a catalyst for hydrosilylation reaction.

Also, WO 2004/050758 proposes a curable fluorine-containing polymer composition which is cured by hydrosilylation reaction by introducing a vinyl group or hydrogen atom bonded to silicon atom to an end of a trunk chain or an end of a side chain of a fluorine-containing polymer having methylene group such as a vinylidene fluoride (VDF) polymer and a copolymer of ethylene and fluorine-containing olefin and combining the polymer with a crosslinking agent.

The curable fluorine-containing polymer composition which is described in JP6-192524A has a problem that a cured article obtained by curing the composition has a significantly low mechanical strength and is not practicable.

Also, the curable fluorine-containing polymer composition which is described in WO 2004/050758 is one comprising, as a main ingredient, a fluorine-containing polymer substantially comprising vinylidene fluoride (VDF) as a main component, and is not a curable fluorine-containing polymer composition which is cured by hydrosilylation reaction of a fluorine-containing polymer prepared by copolymerizing a fluorinated ethylenic monomer and a non-fluorinated ethylenic monomer to introduce alkenyl group to its side chain.

DISCLOSURE OF INVENTION

It is an object of the present invention to provide a curable fluorine-containing polymer composition which is quickly cured at relatively low temperatures by hydrosilylation reaction and provides a coating film having high hardness, excellent solvent resistance and flexibility.

A curable fluorine-containing polymer composition of the present invention is characterized by comprising:
(A) a fluorine-containing polymer comprising repeating units derived from a fluorinated ethylenic monomer and repeating units derived from a non-fluorinated ethylenic monomer, in which a part or the whole of the repeating units derived from the non-fluorinated ethylenic monomer is a repeating unit represented by the formula:

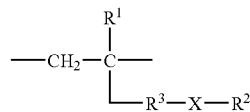

wherein $R^1$ is hydrogen atom or methyl; $R^2$ is a monovalent hydrocarbon group having ethylenic carbon-carbon double bond; X is a group represented by —C(O)NH— or —C(O)—; $R^3$ is a group represented by —O—, —O[CH($R^4$)]$_m$O—, —(CH$_2$)$_m$O, —OC(O)—(CH$_2$)$_n$O— or —(CH$_2$)$_m$OC(O)—(CH$_2$)$_n$O—, where $R^4$ is —H, —OH, —CH$_2$OH or —O—X—$R^2$ (in the formula, $R^2$ and X are as defined above), "m" is an integer of 1 to 10, and "n" is an integer of 1 to 10,
(B) a siloxane compound having hydrogen atom bonded to silicon atom, and
(C) a catalyst for hydrosilylation reaction,
wherein an amount of hydrogen atom bonded to silicon atom in the siloxane compound (B) is 0.1 to 20 moles based on one mole of the monovalent hydrocarbon group having ethylenic carbon-carbon double bond in the fluorine-containing polymer (A), and an amount of the catalyst (C) for hydrosilylation reaction is a catalytic amount.

BEST MODE FOR CARRYING OUT THE INVENTION

The fluorine-containing polymer of the component (A) is characterized by comprising repeating units derived from the fluorinated ethylenic monomer and repeating units derived from the non-fluorinated ethylenic monomer, in which a part or the whole of the repeating units derived from the non-fluorinated ethylenic monomer is a repeating unit represented by the formula:

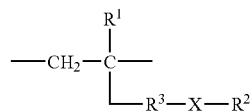

In the formula, $R^1$ is hydrogen atom or methyl.
Also, in the formula, $R^2$ is a monovalent hydrocarbon group having ethylenic carbon-carbon double bond. Examples thereof are alkenyl groups such as vinyl group, allyl group, isopropenyl group, butenyl group, pentenyl group, hexenyl group, heptenyl group and octenyl group; alkenyl-containing aryl groups such as vinyl phenyl group and isopropenyl phenyl group; and alkenyl-containing aralkyl groups such as vinyl phenyl methyl group and a group represented by the formula:

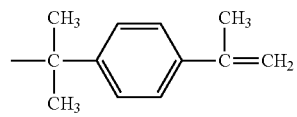

Also, in the formula, X is a group represented by —C(O)NH— or —C(O)—. Further, in the formula, $R^3$ is a group represented by —O—, —O[CH(R⁴)]ₘO—, —(CH₂)ₘO—, —OC(O)—(CH₂)ₙO— or —(CH₂)ₘOC(O)—(CH₂)ₙO—.

R⁴ in this formula is a group represented by —H, —OH, —CH₂OH or —O—X—R² (in the formula, R² and X are as defined above). Also, in the formula, "m" is an integer of 1 to 10, and "n" is an integer of 1 to 10.

Examples of such a repeating unit are, for instance, the following units.

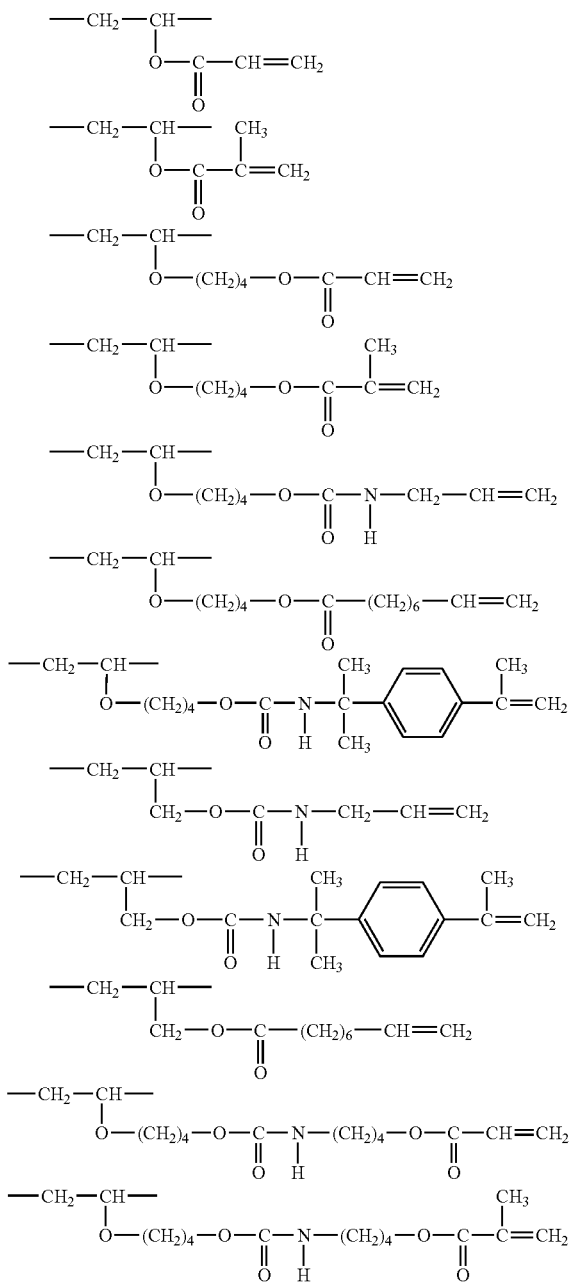

In the fluorine-containing polymer of the component (A), examples of the repeating unit derived from the fluorinated ethylenic monomer are one or two or more kinds of repeating units derived from perhaloolefins such as tetrafluoroethylene (TFE), perfluoro(alkyl vinyl ether) (PAVE), hexafluoropropylene (HFP) and chlorotrifluoroethylene (CTFE); and fluoroolefins such as trifluoroethylene (TrFE), vinylidene fluoride (VdF) and ethylene fluoride, preferably a repeating unit derived from at least one monomer selected from the group consisting of tetrafluoroethylene, hexafluoropropylene, chlorotrifluoroethylene and trifluoroethylene. Especially, perhaloolefins are preferable from the viewpoint of weather resistance, solvent resistance and chemical resistance, and more especially perfluoroolefins are preferable from the viewpoint of weather resistance, solvent resistance, chemical resistance and corrosion resistance. From the viewpoint of weather resistance, solvent resistance and chemical resistance, this repeating unit derived from fluoroolefin is contained in an amount of preferably 1 to 50% by mole, further preferably 10 to 50% by mole, especially preferably 20 to 50% by mole based on the whole repeating units constituting the fluorine-containing polymer (A).

The fluorine-containing polymer (A) can be prepared by reaction of a fluorine-containing polymer (hereinafter referred to as "starting fluorine-containing polymer (A1)") comprising repeating units derived from the fluorinated ethylenic monomer and repeating units derived from the non-fluorinated ethylenic monomer, in which a part or the whole of the repeating units derived from the non-fluorinated ethylenic monomer is a repeating unit represented by the formula (A1):

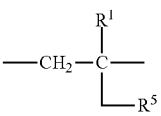

with a compound represented by the formula (A2):

$$R^2-Y$$

(hereinafter referred to as "starting compound (A2)").

With respect to the starting fluorine-containing polymer (A1), in the formula (A1), R¹ is hydrogen atom or methyl; R⁵ is a group represented by —OH, —O[CH(R⁶)]ₘOH, —(CH₂)ₘOH, —OC(O)—(CH₂)ₙOH or —(CH₂)ₘOC(O)—(CH₂)ₙOH (in the formula, R⁶ is a group represented by —H, —OH or —CH₂OH, "m" is an integer of 1 to 10, and "n" is an integer of 1 to 10.

In the starting fluorine-containing polymer (A1), examples of the repeating unit represented by the formula (A1) are preferably repeating units derived from hydroxyl-containing vinyl monomers such as hydroxyalkyl vinyl ether and hydroxyalkyl allyl ether; hydroxyl-containing (meth)acrylic monomers such as hydroxyalkyl methacrylate and hydroxyalkyl acrylate; and hydroxyl-containing monomers such as hydroxyalkyl vinyl ester. Especially, in the hydroxyl-containing vinyl monomers, examples of hydroxyalkyl vinyl ether are hydroxybutyl vinyl ether, hydroxypropyl vinyl ether and hydroxyethyl vinyl ether, and preferred examples of hydroxyalkyl allyl ether are 2-hydroxyethyl allyl ether, 4-hydroxybutyl allyl ether and glycerol monoallyl ether. From the viewpoint of polymerization reactivity with fluoroolefin, hydroxyalkyl vinyl ether, hydroxyalkyl allyl ether and hydroxyalkyl vinyl ester are especially preferred.

Also, in the starting fluorine-containing polymer (A1), examples of the repeating unit derived from the fluorinated ethylenic monomer are the same repeating units as exemplified above. This fluorine-containing polymer may contain repeating unit other than the repeating unit derived from the fluorinated ethylenic monomer and the repeating unit derived from the non-fluorinated ethylenic monomer having hydroxyl group. Examples of such a repeating unit are repeating units derived from alkyl vinyl ethers such as methyl vinyl ether, ethyl vinyl ether, propyl vinyl ether, butyl vinyl ether, n-hexyl vinyl ether, n-octyl vinyl ether, 2-ethylhexyl vinyl ether, benzyl vinyl ether, octadecyl vinyl ether and cyclohexyl vinyl ether; olefins such as ethylene, propylene, n-butene, isobutylene, 2-butene, cyclobutene, 3-methyl-1-butene, cyclopentene, cyclohexene, cycloheptene and cis-cyclooctene; and vinyl esters such as vinyl acetate, vinyl formate, vinyl pivalate, vinyl caproate, VeoVa9 (registered trade mark) (trade name of Shell Chemical Co., Ltd.), VeoVa10 (registered trade mark) (trade name of Shell Chemical Co., Ltd.), vinyl caprylate, vinyl laurate, vinyl myristate, vinyl palmitate, vinyl stearate, vinyl oleate, vinyl benzoate, vinyl p-t-butyl benzoate and vinyl cyclohexyl carboxylate.

A process for preparing the starting fluorine-containing polymer (A1) is not limited particularly, and the polymer can be prepared, for example, by usual radical polymerization process. Specifically, a monomer giving the repeating unit of the formula (A1) is subjected to polymerization usually by an emulsion, suspension or solution polymerization process by using a polymerization solvent and a polymerization initiator. Polymerization temperature is usually 0° C. to 150° C., preferably 5° C. to 95° C. in any of the polymerization processes. Polymerization pressure is usually 0.1 to 10 MPaG (1 to 100 kgf/cm$^2$G) in any of the polymerization processes.

A number average molecular weight of the starting fluorine-containing polymer (A1) which is measured by gel permeation chromatography (GPC) using tetrahydrofuran as an eluate is 1,000 to 1,000,000, preferably 3,000 to 50,000, and its glass transition temperature ($2^{nd}$ run) measured with a differential scanning calorimeter (DSC) is 10° C. to 60° C., preferably 20° C. to 40° C.

In an emulsion polymerization process, water is used as a polymerization solvent, and in a suspension polymerization process, for example, water, tert-butanol, 1,1,2-trichloro-1,2, 2-trifluoroethane, 1,2-dichloro-1,1,2,2-tetrafluoroethane or a mixture thereof is used as a polymerization solvent. In a solution polymerization process, there are esters such as methyl acetate, ethyl acetate, propyl acetate, n-butyl acetate and tert-butyl acetate; ketones such as acetone, methyl ethyl ketone and cyclohexanone; aliphatic hydrocarbons such as hexane, cyclohexane, octane, nonane, decane, undecane, dodecane and mineral spirit; aromatic hydrocarbons such as benzene, toluene, xylene, naphthalene and solvent naphtha; alcohols such as methanol, ethanol, tert-butanol, iso-propanol and ethylene glycol monoalkyl ether; cyclic ethers such as tetrahydrofuran, tetrahydropyran and dioxane; dimethyl sulfoxide, and a mixture thereof.

Examples of a usable polymerization initiator are, for instance, persulfates such as ammonium persulfate and potassium persulfate (if necessary, a reducing agent such as sodium hydrogen sulfite, sodium pyrosulfite, cobalt naphthenate or dimethyl aniline can be used together); redox initiators comprising an oxidizing agent (for example, ammonium peroxide, potassium peroxide or the like), a reducing agent (for example, sodium sulfite or the like) and a transition metal salt (for example, iron sulfate, or the like); diacyl peroxides such as acetyl peroxide and benzoyl peroxide; dialkoxycarbonyl peroxides such as isopropoxycarbonyl peroxide and tert-butoxycarbonyl peroxide; ketone peroxides such as methyl ethyl ketone peroxide and cyclohexanone peroxide; hydroperoxides such as hydrogen peroxide, tert-butyl hydroperoxide and cumene hydroperoxide; dialkyl peroxides such as di-tert-butyl peroxide and dicumyl peroxide; alkyl peroxyesters such as tert-butyl peroxyacetate and tert-butyl peroxypivalate; and azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobis(isobutyrate), 2,2'-azobis[2-(hydroxymethyl)propionitrile] and 4,4'-azobis(4-cyanopentenoate).

The starting compound (A2) reacts with hydroxyl group in the starting fluorine-containing polymer (A1) to introduce a monovalent hydrocarbon group having ethylenic carbon-carbon double bond to the obtained fluorine-containing polymer (A).

In this starting compound (A2), in the formula, R$^2$ is a monovalent hydrocarbon group having ethylenic carbon-carbon double bond, and there are exemplified the same groups as above.

Also, in the formula (A2), Y is a group represented by —NCO, —C(O)Br or —C(O)Cl. Examples of such a compound are unsaturated fatty acid halides such as acrylyl chloride, acrylyl bromide, crotonic acid chloride, crotonic acid bromide, undecylenic acid chloride and undecylenic acid bromide; and isocyanate compounds such as allyl isocyanate and 1,1-dimethyl-1-vinylphenylmethyl isocyanate, and isocyanate compounds are preferred and allyl isocyanate is especially preferred.

In the above-mentioned reaction, the amount of starting compound (A2) having a group reactable with hydroxyl group is within a range from 0.01 to 10 moles, especially preferably from 0.05 to 2 moles based on 1 mole of hydroxyl group in the starting fluorine-containing polymer (A1).

Example of the so-prepared fluorine-containing polymer of the component (A) is preferably a fluorine-containing polymer comprising a repeating unit represented by the formula (1):

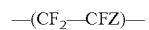

wherein Z is a group represented by —H, —Cl, —F or —CF$_3$, a repeating unit represented by the formula (2):

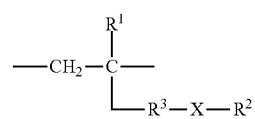

wherein R$^1$ is hydrogen atom or methyl; R$^2$ is a monovalent hydrocarbon group having ethylenic carbon-carbon double bond; X is a group represented by —C(O)NH— or —C(O)—; R$^3$ is a group represented by —O—, —O[CH(R$^4$)]$_m$O—, —(CH$_2$)$_m$O—, —OC(O)—(CH$_2$)$_n$O— or —(CH$_2$)$_m$OC(O)—(CH$_2$)$_n$O—, where R$^4$ is a group represented by —H, —OH, —CH$_2$OH or —O—X—R$^2$ (in the formula, R$^2$ and X are as defined above), "m" is an integer of 1 to 10, and "n" is an integer of 1 to 10, a repeating unit represented by the formula (3):

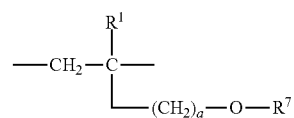

wherein R$^1$ is hydrogen atom or methyl; "a" is 0 or 1; R$^7$ is hydrogen atom or a substituted or un-substituted monovalent hydrocarbon group having no ethylenic carbon-carbon double bond, a repeating unit represented by the formula (4):

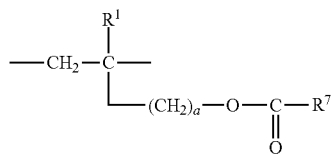

wherein $R^1$ is hydrogen atom or methyl; "a" is 0 or 1; $R^7$ is hydrogen atom or a substituted or un-substituted monovalent hydrocarbon group having no ethylenic carbon-carbon double bond, a repeating unit represented by the formula (5):

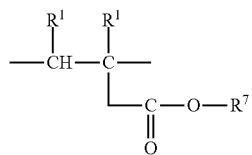

wherein $R^1$ s are the same or different and each is hydrogen atom or methyl; $R^7$ is hydrogen atom or a substituted or un-substituted monovalent hydrocarbon group having no ethylenic carbon-carbon double bond, and a repeating unit represented by the formula (6):

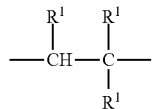

wherein $R^1$s are the same or different and each is hydrogen atom or methyl. In the formulas, $R^7$ is hydrogen atom or a substituted or un-substituted monovalent hydrocarbon group having no ethylenic carbon-carbon double bond, and examples thereof are alkyl groups such as methyl, ethyl, propyl, butyl, pentyl, heptyl and octyl; aryl groups such as phenyl, tolyl and xylyl; aralkyl groups such as benzyl and phenethyl; chloroalkyl groups such as chloromethyl and chloroethyl; chloroaryl groups such as chlorobenzyl; and hydroxyalkyl groups such as hydroxyethyl.

Examples of the monomer giving the repeating unit (1) represented by the formula (1) are tetrafluoroethylene (TFE), hexafluoropropylene (HFP), chlorotrifluoroethylene (CTFE) and trifluoroethylene (TrFE).

The repeating unit (2) represented by the formula (2) and preferable examples thereof are the same as the repeating unit of the formula (2) and examples thereof explained supra, and also the method of introducing ethylenic carbon-carbon double bond can be employed.

Examples of the monomer providing the repeating unit (3) represented by the formula (3) are, for instance, vinyl ethers, and examples of alkyl vinyl ethers are methyl vinyl ether, ethyl vinyl ether, n-propyl vinyl ether, isopropyl vinyl ether, n-butyl vinyl ether, isobutyl vinyl ether, sec-butyl vinyl ether, tert-butyl vinyl ether, isoamyl vinyl ether, n-hexyl vinyl ether, cyclohexyl vinyl ether, n-octyl vinyl ether, 2-ethylhexyl vinyl ether, n-decyl vinyl ether, cetyl vinyl ether, octadecyl vinyl ether, 2-chloroethyl vinyl ether and 2,2,2-trifluoroethyl vinyl ether. Examples of aromatic vinyl ethers are phenyl vinyl ether, o-cresyl vinyl ether, p-cresyl vinyl ether, p-chlorophenyl vinyl ether, α-naphthyl vinyl ether and β-naphthyl vinyl ether. Examples of alkyl allyl ethers are methyl allyl ether, ethyl allyl ether, butyl allyl ether and cyclohexyl allyl ether. Examples of hydroxyalkyl vinyl ethers are hydroxybutyl vinyl ether, hydroxypropyl vinyl ether and hydroxyethyl vinyl ether. Examples of hydroxyalkyl allyl ethers are 2-hydroxyethyl allyl ether, 4-hydroxybutyl allyl ether and glycerol monoallyl ether.

Examples of the monomer providing the repeating unit (4) represented by the formula (4) are, for instance, vinyl esters such as vinyl acetate, vinyl formate, vinyl pivalate, vinyl caproate, vinyl caprylate, VeoVa9 (registered trade mark) (vinyl versatate comprising carboxylic acid having 9 carbon atoms and being available from Shell Chemical Co., Ltd.), VeoVa10 (registered trade mark) (vinyl versatate comprising carboxylic acid having 10 carbon atoms and being available from Shell Chemical Co., Ltd.), vinyl caprate, vinyl laurate, vinyl myristate, vinyl palmitate, vinyl stearate, vinyl oleate, vinyl benzoate, vinyl p-t-butyl benzoate and vinyl cyclohexyl carboxylate. From the viewpoint of reactivity, weather resistance, chemical stability, compatibility with additives and compatibility with the curing agent, vinyl pivalate, vinyl benzoate, vinyl p-t-butyl benzoate and VeoVa9 (registered trade mark) are preferred.

Examples of the monomer providing the repeating unit (5) represented by the formula (5) are, for instance, lower alkyl esters of (meth)acrylic acid such as methyl acrylate, n-butyl acrylate, methyl methacrylate, ethyl methacrylate and n-butyl methacrylate; alkyl esters of (meth)acrylic acid having 4 to 10 carbon atoms such as 2-ethylhexyl acrylate, 2-ethylhexyl methacrylate, cyclohexyl acrylate and cyclohexyl methacrylate; unsaturated carboxylic acids such as acrylic acid, methacrylic acid, maleic acid and crotonic acid; and hydroxyl-containing monomers such as hydroxyethyl acrylate, hydroxyethyl methacrylate, hydroxypropyl acrylate and hydroxypropyl methacrylate.

Examples of the monomer providing the repeating unit (6) represented by the formula (6) are, for instance, ethylene, propylene, isobutylene and 2-butene, and from the viewpoint of solubility in an organic solvent, optical properties and electrical properties, propylene and isobutylene are preferred.

It is preferable that the repeating unit (1), the repeating unit (2), the repeating unit (3), the repeating unit (4), the repeating unit (5) and the repeating unit (6) are contained in an amount of 1 to 50% by mole, 1 to 50% by mole, 0 to 98% by mole, 0 to 98% by mole, 0 to 98% by mole, and 0 to 98% by mole, respectively, when the amount of the whole repeating units constituting the fluorine-containing polymer (A) is 100% by mole.

As mentioned above, the repeating units (3) to (6) are optional components, but at least one of them is contained in the fluorine-containing polymer (A). Non-limiting examples of preferred combination of the repeating units of this fluorine-containing polymer are as follows.

(1)/(2)/(3) (1 to 50/1 to 50/0 to 98 in a percent by mole ratio)
(1)/(2)/(4) (1 to 50/1 to 50/0 to 98 in a percent by mole ratio)
(1)/(2)/(5) (1 to 50/1 to 50/0 to 98 in a percent by mole ratio)
(1)/(2)/(6) (1 to 50/1 to 50/0 to 98 in a percent by mole ratio)
(1)/(2)/(3)/(4) (1 to 50/1 to 50/1 to 97/1 to 97 in a percent by mole ratio)
(1)/(2)/(4)/(6) (1 to 50/1 to 50/1 to 97/1 to 97 in a percent by mole ratio)

A number average molecular weight which is measured by gel permeation chromatography (GPC) using tetrahydrofuran as an eluate is 1,000 to 1,000,000, preferably 3,000 to 50,000, and a glass transition temperature ($2^{nd}$ run) measured with a differential scanning calorimeter (DSC) is −10° C. to 120° C., preferably 0° C. to 100° C. If the molecular weight is too small, when a coating composition is prepared, hardness of the obtained coating film is insufficient, and if the molecular weight is too large, a viscosity of the composition becomes large, thereby making handling difficult.

Next, the siloxane compound of the component (B) functions as a crosslinking agent in the curable fluorine-containing polymer composition of the present invention, and is characterized by having hydrogen atom bonded to silicon atom (hydrogen atom directly bonded to silicon atom).

Example of the siloxane compound of the component (B) is a siloxane compound having a diorganosiloxy group (b1) represented by the formula (b1):

—O—SiR$^8_2$H where R$^8$ is a monovalent hydrocarbon group which has 1 to 10 carbon atoms and does not have ethylenic carbon-carbon double bond.

Examples of the diorganosiloxy group (b1) are, for instance, a group represented by the formula:

—O—Si(CH$_3$)$_2$H, a group represented by the formula:

—O—Si(C$_6$H$_5$)$_2$H, a group represented by the formula:

—O—Si(CH$_3$)(C$_6$H$_5$)H, and a group represented by the formula:

—O—Si(C$_2$H$_5$)$_2$H, and especially the group represented by the formula:

—O—Si(CH$_3$)$_2$H is preferred from the viewpoint of satisfactory reactivity in the hydrosilylation reaction.

Example of the siloxane compound (B) is a siloxane compound (B1) represented by the formula (B1):

R$^9_b$Si(OR$^{10}$)$_{4-b}$ wherein R$^9$ is a substituted or un-substituted monovalent hydrocarbon group, an organic group having (meth)acryl group or an organic group having epoxy group; R$^{10}$ is a monovalent hydrocarbon group having no ethylenic carbon-carbon double bond or a diorganosilyl group (b2) represented by the formula (b2):

—SiR$^8_2$H wherein R$^8$ is a monovalent hydrocarbon group which has 1 to 10 carbon atoms and does not have ethylenic carbon-carbon double bond; at least two R$^{10}$s in one molecule are the diorganosilyl groups (b2); "b" is an integer of 0 to 2, or a siloxane compound (B2) represented by the formula (B2):

R$^9_{c1}$(R$^{10}$O)$_{3-c1}$Si—R$^{11}$—SiR$^9_{c2}$(OR$^{10}$)$_{3-c2}$ wherein R$^9$ is a substituted or un-substituted monovalent hydrocarbon group, an organic group having (meth)acryl group or an organic group having epoxy group; R$^{10}$ is a monovalent hydrocarbon group having no ethylenic carbon-carbon double bond or a diorganosilyl group (b2) represented by the formula (b2):

—SiR$^8_2$H wherein R$^8$ is a monovalent hydrocarbon group which has 1 to 10 carbon atoms and does not have ethylenic carbon-carbon double bond; at least two R$^{10}$s in one molecule are the diorganosilyl groups (b2); R$^{11}$ is a divalent organic group; c1 is an integer of 0 to 3; c2 is an integer of 0 to 3; both of c1 and c2 are not 3 at the same time, or a siloxane compound (B3) represented by the average unit formula (B3):

(HR$^8_2$SiO$_{1/2}$)$_d$(R$^8$SiO$_{3/2}$)$_e$(SiO$_{4/2}$)$_f$ wherein R$^8$ is a monovalent hydrocarbon group which has 1 to 10 carbon atoms and does not have ethylenic carbon-carbon double bond; "d" is a positive number; "e" is 0 or a positive number; "f" is 0 or a positive number; d/(e+f) is a number of from 0.5 to 1.9. In the formula, R$^8$ is a monovalent hydrocarbon which has 1 to 10 carbon atoms and does not have ethylenic carbon-carbon double bond, and examples thereof are alkyl groups such as methyl, ethyl, propyl, butyl, pentyl and hexyl; aryl groups such as phenyl, tolyl and xylyl; and aralkyl groups such as benzyl and phenethyl. Also, in the formula, R$^9$ is a substituted or un-substituted monovalent hydrocarbon group, an organic group having (meth)acryl group or an organic group having epoxy group, and examples of a substituted or un-substituted monovalent hydrocarbon group of R$^9$ are alkyl groups such as methyl, ethyl, propyl, butyl, pentyl, and hexyl; alkenyl groups such as vinyl, allyl and pentenyl; aryl groups such as phenyl, tolyl and xylyl; and aralkyl groups such as benzyl and phenethyl. Examples of an organic group having (meth)acryl group of R$^9$ are 3-methacryloxypropyl group and 3-acryloxypropyl group, and examples of an organic group having epoxy group of R$^9$ are 3-glycycloxypropyl group, 2-(3,4-epoxycyclohexyl)-ethyl group and 4-oxiranylbutyl group. Also, in the formula, R$^{10}$ is a monovalent hydrocarbon group having no ethylenic carbon-carbon double bond, and examples thereof are the same as in R$^8$.

Examples of the siloxane compound (B1) are a siloxane compound represented by the formula:

CH$_3$Si{OSi(CH$_3$)$_2$H}$_3$, a siloxane compound represented by the formula:

CH$_3$(C$_6$H$_5$)Si{OSi(CH$_3$)$_2$H}$_2$, a siloxane compound represented by the formula:

C$_3$H$_7$Si{OSi(CH$_3$)$_2$H}$_3$, a siloxane compound represented by the formula:

C$_4$H$_9$Si{OSi(CH$_3$)$_2$H}$_3$, a siloxane compound represented by the formula:

C$_6$H$_{13}$Si{OSi(CH$_3$)$_2$H}$_3$, a siloxane compound represented by the formula:

C$_8$H$_{17}$Si{OSi(CH$_3$)$_2$H}$_3$, a siloxane compound represented by the formula:

C$_6$H$_5$Si{OSi(CH$_3$)$_2$H}$_3$, a siloxane compound represented by the formula:

(C$_6$H$_5$)$_2$Si{Si(CH$_3$)$_2$H}$_2$, a siloxane compound represented by the formula:

CF$_3$C$_2$H$_4$Si{OSi(CH$_3$)$_2$H}$_3$, a siloxane compound represented by the formula:

C$_8$F$_{17}$C$_2$H$_4$Si{OSi(CH$_3$)$_2$H}$_3$, a siloxane compound represented by the formula:

$$CH_2=C(CH_3)-C(=O)-O-(CH_2)_3-Si\{OSi(CH_3)_2H\}_3,$$

a siloxane compound represented by the formula:

$$CH_2-CH(-O-)-CH_2-O-(CH_2)_3-Si\{OSi(CH_3)_2H\}_3,$$

a siloxane compound represented by the formula:

(epoxycyclohexyl)–CH$_2$–CH$_2$–Si{OSi(CH$_3$)$_2$H}$_3$, a siloxane compound represented by the formula:

$$CH_2=C(CH_3)-C(=O)-O-(CH_2)_3-Si(CH_3)\{OSi(CH_3)_2H\}_2,$$

a siloxane compound represented by the formula:

$$CH_2-CH(-O-)-CH_2-O-(CH_2)_3-Si(CH_3)\{OSi(CH_3)_2H\}_2,$$

a siloxane compound represented by the formula:

(epoxycyclohexyl)–CH$_2$–CH$_2$–Si(CH$_3$){OSi(CH$_3$)$_2$H}$_2$, and the like, and from the viewpoint of satisfactory compatibility with the above-mentioned component (A), the siloxane compound represented by the formula:

$$CH_2=C(CH_3)-C(=O)-O-(CH_2)_3-Si\{OSi(CH_3)_2H\}_3$$

is preferred.

Examples of the siloxane compound (B2) are a siloxane compound represented by the formula:

$$\{(CH_3)_2HSiO\}_3Si-C_2H_4-Si\{OSi(CH_3)_2H\}_3,$$

a siloxane compound represented by the formula:

$$\{(CH_3)_2HSiO\}_3Si-C_6H_{12}-Si\{OSi(CH_3)_2H\}_3,$$

a siloxane compound represented by the formula:

$$\{(CH_3)_2HSiO\}_2CH_3Si-C_2H_4-SiCH_3\{OSi(CH_3)_2H\}_2,$$

a siloxane compound represented by the formula:

$$\{(CH_3)_2HSiO\}_2CH_3Si-C_6H_{12}-SiCH_3\{OSi(CH_3)_2H\}_2,$$

a siloxane compound represented by the formula:

$$\{(C_6H_5)_2HSiO\}_3Si-C_2H_4-Si\{OSi(C_6H_5)_2H\}_3,$$

a siloxane compound represented by the formula:

$$\{(C_6H_5)_2HSiO\}_3Si-C_6H_{12}-Si\{OSi(C_6H_5)_2H\}_3,$$

a siloxane compound represented by the formula:

$$\{(CH_3)_2HSiO\}_3Si-C_3H_6(OC_2H_4)_m(OC_3H_6)_n OC_3H_6-Si\{OSi(CH_3)_2H\}_3,$$

(in the formula, "m" is an integer of 0 or more, "n" is an integer of 0 or more, and "m" and "n" are not 0 at the same time), and the like, and from the viewpoint of satisfactory compatibility with the above-mentioned component (A), the siloxane compound represented by the formula:

$$\{(CH_3)_2HSiO\}_3Si-C_2H_4-Si\{OSi(CH_3)_2H\}_3,$$

and the siloxane compound represented by the formula:

$$\{(CH_3)_2HSiO\}_3Si-C_6H_{12}-Si\{OSi(CH_3)_2H\}_3$$

are preferred.

Examples of the siloxane compound (B3) are a siloxane compound represented by the average unit formula:

$$\{H(CH_3)_2SiO_{1/2}\}_d(SiO_{4/2})_f,$$

a siloxane compound represented by the average unit formula:

$$\{H(CH_3)_2SiO_{1/2}\}_d(CH_3SiO_{3/2})_e(SiO_{4/2})_f,$$

a siloxane compound represented by the average unit formula:

$$\{H(CH_3)_2SiO_{1/2}\}_d(C_6H_5SiO_{3/2})_e(SiO_{4/2})_f,$$

a siloxane compound represented by the average unit formula:

$$\{H(CH_3)_2SiO_{1/2}\}_d(CH_3SiO_{3/2})_e,$$

a siloxane compound represented by the average unit formula:

$$\{H(CH_3)_2SiO_{1/2}\}_d(C_6H_5SiO_{3/2})_e,$$

a siloxane compound represented by the average unit formula:

$$\{H(CH_3)(C_6H_5)SiO_{1/2}\}_d(SiO_{4/2})_f,$$

and the like (in the above formulas, any of "d", "e" and "f" are positive numbers), and from the viewpoint of satisfactory compatibility with the above-mentioned component (A), the siloxane compound represented by the average unit formula:

$$\{H(CH_3)_2SiO_{1/2}\}_d(SiO_{4/2})_f,$$

(in the above formula, any of "d" and "f" are positive numbers) is preferred.

In the composition of the present invention, the siloxane compound (B) is contained in such an amount that the amount of hydrogen atom bonded to silicon atom in the siloxane compound (B) is within a range from 0.1 to 20 moles, especially preferably from 0.1 to 10 moles based on 1 mole of the monovalent hydrocarbon group having ethylenic carbon-carbon double bond in the fluorine-containing polymer (A). This is because when the amount of component (B) is less than the above-mentioned lower limit, there is a tendency that the obtained composition is not cured sufficiently, and when the amount exceeds the above-mentioned upper limit, mechanical properties of the obtained cured article tends to be lowered.

Next, the catalyst of the component (C) for the hydrosilylation reaction is a catalyst for accelerating the hydrosilylation reaction of the composition of the present invention. Examples of the catalyst are platinum catalyst, palladium catalyst, rhodium catalyst, ruthenium catalyst, and iridium catalyst, and platinum catalyst is preferred since it is relatively easily obtainable. Examples of platinum catalyst are chloroplatinic acid, alcohol-modified chloroplatinic acid, carbonyl complex of platinum, olefin complex of platinum, and alkenylsiloxane complex of platinum.

In the composition of the present invention, the amount of catalyst (C) for the hydrosilylation reaction is a catalytic amount accelerating the curing of the composition of the present invention, and specifically in the composition of the present invention, an amount in mass unit of metallic catalytic is within a range preferably from 0.1 to 1,000 ppm, especially preferably from 1 to 500 ppm. This is because when the amount of component (C) is less than the above-mentioned lower limit, there is a tendency that curing of the obtained composition cannot be accelerated sufficiently, and when the amount exceeds the above-mentioned upper limit, a problem with coloration of the obtained cured article tends to occur.

The composition of the present invention may contain a reaction-inhibiting agent, for example, acetylene alcohol such as 1-ethynyl-1-cyclohexanol, 2-ethynylisopropanol, 2-methyl-3-butyn-2-ol, 3,5-dimethyl-1-hexyn-3-ol or 2-phenyl-3-butyn-2-ol; alkenylsiloxane such as 1,3,5,7-tetravinyltetramethylcyclotetrasiloxane; maleate compound such as diallyl maleate, dimethyl maleate or diethyl maleate; triallyl cyanurate, or triazole. By blending a reaction-inhibiting agent, there is exhibited an effect that the obtained composition can be of one-component type and a pot life (usable period) of the obtained composition can be made long enough. The amount of this reaction-inhibiting agent is not limited particularly, and is preferably 10 to 50,000 ppm in a mass unit based on the composition of the present invention.

In addition, the composition of the present invention may contain a solvent as the component (D). The use of the solvent (D) is advantageous since workability in coating is improved, and appearance of the obtained coating film becomes satisfactory. Examples of the solvent (D) which is usable on the composition of the present invention are esters such as methyl acetate, ethyl acetate, propyl acetate, n-butyl acetate and tert-butyl acetate; ketones such as acetone, methyl ethyl ketone and cyclohexanone; aliphatic hydrocarbons such as hexane, cyclohexane, octane, nonane, decane, undecane, dodecane and mineral spirit; aromatic hydrocarbons such as benzene, toluene, xylene, naphthalene and solvent naphtha; alcohols such as methanol, ethanol, tert-butanol, iso-propanol and ethylene glycol monoalkyl ether; cyclic ethers such as tetrahydrofuran, tetrahydropyran and dioxane; dimethyl sulfoxide, and a mixture thereof.

The curable fluorine-containing polymer composition of the present invention can be a coating composition as it is or in the form of a blend with other additives. Examples of the additives are, for instance, usual additives for coating such as a pigment, pigment dispersant, thickener, leveling agent, defoaming agent, film forming aid, ultraviolet absorber, HALS (photo-stabilizer), flatting agent, filler, colloidal silica, antifungal agent, silane coupling agent, anti-skinning agent, antioxidant, flame retardant, antisagging agent, antistatic agent, and rusting-preventive agent.

The curable fluorine-containing polymer composition of the present invention is quickly cured at relatively low temperatures by hydrosilylation reaction and the obtained cured article has high weather resistance, and is excellent in stain-proofing property, chemical resistance, optical properties, mechanical properties, adhesion to a substrate and resistance to thermal yellowing. Therefore, the composition can be used as a coating, like usual curable compositions, for indoor use for building materials and interior materials and for outdoor use for building materials, automobiles, airplanes, ships and trains, and can be coated directly on metals, concrete and plastics or can be over-coated on undercoats such as wash primer, rust-preventive coating, epoxy coating, acrylic resin coating and polyester resin coating. Further, the composition can be used as a sealing material and a film forming agent.

EXAMPLE

The curable fluorine-containing polymer composition of the present invention is then explained in detail by means of examples and comparative examples. In examples, measuring methods are as follows.
(NMR Analysis)
NMR measuring equipment: available from BRUKER
$^1$H-NMR measuring condition: 300 MHz (tetramethylsilane=0 ppm)
$^{19}$F-NMR measuring condition: 282 MHz (trichlorofluoromethane=0 ppm)
(Elemental Analysis)
Measuring equipment: CHN CORDER available from Jay Science Kabushiki Kaisha and Ion Analyzer 901 available from Orion Research Kabushiki Kaisha
(Infrared Absorption (IR) Analysis)
Measuring equipment: available from Perkin Elmer Co., Ltd.
Measuring conditions: After coating a reactive liquid on a NaCl plate and drying it, spectrum analysis is carried out in a region of from 4,000 cm$^{-1}$ to 400 cm$^{-1}$.
(Hydroxyl Value and Acid Value)
Calculated from composition obtained by NMR and elemental analyses.
(Number Average Molecular Weight)
Measuring device: GPC (Model HLC-8020) available from Toso Kabushiki Kaisha
Measuring conditions: Three TSKgel:GMHXL, one G2500HXL and one GRCXL-L are used as columns. Tetrahydrofuran is used as an eluate, and polystyrene, a molecular weight of which is known, is used as a reference sample.
(Glass Transition Temperature Tg)
Tg is determined at $2^{nd}$ run by a mid-point method using a DSC measuring equipment 7 Series available from Perkin Elmer Co., Ltd. according to ASTM E1356-98.
Measuring Conditions
Temperature elevating rate: 10° C./min
Amount of sample: 10 mg
Heat cycle: from 25° C. to 150° C., heating, cooling, heating In addition, pencil hardness, bending property and solvent resistance of a coating film are evaluated as follows.
(Pencil Hardness)
Evaluated according to JIS K5600.
(Bending Property)
Bending property of a coating film is evaluated according to the following criteria by bending a coated plate at a bend angle of 180 degrees according to the T-bend test method. Figures on the left of T indicate a value obtained by subtracting 1 from the number of bending cycles.

0T: bending once
1T: bending twice
2T: bending three times
3T: bending four times
(Solvent Resistance)

After rubbing a coating film 100 times with a cotton cloth impregnated with methyl ethyl ketone, a state of the coating film surface is evaluated with naked eyes by the following criteria.
5: No change is found.
4: Gloss is somewhat decreased.
3: Swelling of a coating film occurs, and significant loss of gloss is found.
2: About a half or more of a coating film is dissolved.
1: The whole coating film is dissolved.

SYNTHESIS EXAMPLE 1

Into a 6,000 ml stainless steel autoclave were poured 2,500 g of n-butyl acetate, 520.5 g of VeoVa9 (hereinafter referred to as "VV9") and 129.5 g of 4-hydroxybutyl vinyl ether (HBVE), and after cooling the autoclave to 5° C., a step for replacing the inside of the autoclave with nitrogen gas under reduced pressure was repeated three times. Lastly, the inside pressure was reduced again and 492.0 g of tetrafluoroethylene (TFE) was introduced in the autoclave. The mixture was heated up to 62.0° C. with stirring, and 28.38 g of PERBUTYL PV (trade name of peroxide polymerization initiator available from NOF CORPORATION) to start polymerization. When the inside pressure of a reactor decreased from 1.5 MPa·G to 0.4 MPa·G, the reaction was terminated. Polymerization yield was 98.0%. According to $^{19}$F-NMR, $^1$H-NMR and elemental analyses, the obtained fluorine-containing polymer was a fluorine-containing copolymer (1) comprising 47% by mole of repeating unit derived from TFE and represented by the formula:

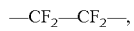

38% by mole of repeating unit derived from VV9 and represented by the formula:

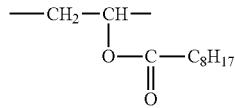

and 15% by mole of repeating unit derived from HBVE and represented by the formula:

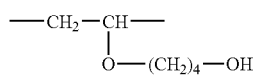

and its number average molecular weight Mn was 11.0×1,000. Also, its glass transition temperature Tg was 30° C., and its hydroxyl value was 63 mgKOH/g.

Next, into a 300 ml 4-necked flask equipped with a stirrer and subjected to replacement with nitrogen gas were poured 188.5 g of n-butyl acetate solution of the obtained fluorine-containing copolymer (1) and 5.25 g of allyl isocyanate, and the flask was held at 80° C. for about 20 hours with stirring and then its concentration was adjusted to prepare a n-butyl acetate solution containing 40% by mass of a fluorine-containing polymer (I) comprising 47% by mole of repeating unit represented by the formula:

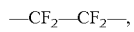

38% by mole of repeating unit represented by the formula:

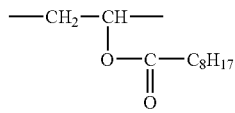

and 15% by mole of repeating unit represented by the formula:

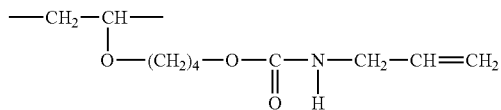

SYNTHESIS EXAMPLE 2

Into a 6,000 ml stainless steel autoclave were poured 2,500 g of n-butyl acetate, 493.5 g of vinyl pivalate (VPi) and 133.7 g of 4-hydroxybutyl vinyl ether (HBVE), and after cooling the autoclave to 5° C., a step for replacing the inside of the autoclave with nitrogen gas under reduced pressure was repeated three times. Next, the inside pressure was reduced again, and 201 g of isobutylene (IB) and 467.1 g of tetrafluoroethylene (TFE) were introduced in the autoclave. The mixture was heated up to 80.0° C. with stirring, and 36.0 g of PERBUTYL 355 (trade name of peroxide polymerization initiator available from NOF CORPORATION) to start the polymerization. When the inside pressure of a reactor decreased from 2.0 MPa·G to 0.4 MPa·G, the reaction was terminated. Polymerization yield was 98.0%. According to $^{19}$F-NMR, $^1$H-NMR and elemental analyses, the obtained fluorine-containing copolymer was a fluorine-containing copolymer (2) comprising 47.0% by mole of repeating unit derived from TFE and represented by the formula:

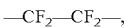

40.8% by mole of repeating unit derived from VPi and represented by the formula:

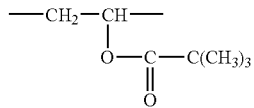

and 12.2% by mole of repeating unit derived from HBVE and represented by the formula:

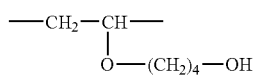

and its number average molecular weight Mn was 12.0×1,000. Also, its glass transition temperature Tg was 32° C., and its hydroxyl value was 60 mgKOH/g.

Next, into a 300 ml 4-necked flask equipped with a stirrer and subjected to replacement with nitrogen gas were poured 188.6 g of n-butyl acetate solution of the obtained fluorine-containing copolymer (2), 23.9 g of n-butyl acetate and 5.0 g of allyl isocyanate, and the flask was held at 80° C. for about 20 hours with stirring and then its concentration was adjusted to prepare a n-butyl acetate solution containing 40% by mass of a fluorine-containing polymer (II) comprising 47.0% by mole of repeating unit represented by the formula:

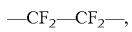

40.8% by mole of repeating unit represented by the formula:

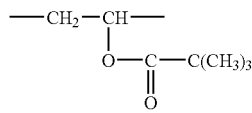

and 12.2% by mole of repeating unit represented by the formula:

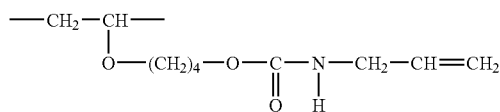

SYNTHESIS EXAMPLE 3

Into a 100 ml 3-necked flask was poured 50 g of an aqueous solution of 20% by mass NaCl, and the solution was cooled to −15° C. Then, by adding 1.05 g of $Na_2O_2$ to the solution, its temperature increased to −10° C. The solution was cooled again to −15° C., and 4.91 g of a compound represented by the formula:

$(CH_3)_3C—OCH_2CF_2COCl$ was added thereto dropwise. After completion of the addition, stirring was continued for 30 minutes while cooling to −15° C. Then, thereto was added 5.0 ml of 1,1,2-trichloro-1,2,2-trifluoroethane cooled to −15° C., followed by stirring for another 30 minutes. Soon after allowed to stand, the mixture was separated into two layers. By collecting a white suspension of the lower layer, 6.0 ml of a solution was obtained. A concentration of the obtained peroxide measured by an iodometric titration method was 134 mg/ml.

A 100 ml stainless steel reactor was cooled to −50° C., and 4.6 ml of the 1,1,2-trichloro-1,2,2-trifluoroethane solution of the peroxide was poured in the reactor. After the inside of the reactor was replaced with nitrogen gas, 10.9 g of hexafluoropropylene and 6.5 g of vinylidene fluoride were poured in the reactor. The stainless steel reactor was subjected to shaking at 20° C. for 2.5 hours for carrying out polymerization. The inside pressure of the stainless steel reactor decreased from 1.28 MPa·G to 1.17 MPa·G. After completion of the polymerization, by evaporating unreacted monomers and 1,1,2-trichloro-1,2,2-trifluoroethane, 4.2 g of a liquid polymer (a) was obtained. According to NMR analysis, the polymer was one comprising repeating unit derived from vinylidene fluoride and represented by the formula:

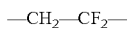

and repeating unit derived from hexafluoropropylene and represented by the formula:

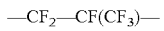

in a molar ratio of 76.5:23.5.

To the obtained liquid polymer (a) was added trifluoroacetic acid in the same mass amount as the polymer, followed by 2-hour heating at 70° C. After the reaction, washing with water and then drying were conducted to obtain 3.5 g of a liquid polymer (b). As a result of NMR and IR analyses, it was found that the tert-butoxy group at the end of the liquid polymer (a) had been converted to hydroxyl group in the liquid polymer (b).

After adding 1.0 g of allyl isocyanate to 3.5 g of the obtained liquid polymer (b) and conducting reaction at normal temperature for 24 hours, the mixture was heated to 100° C. to complete the reaction. Further, the mixture was heated to 100° C. under reduced pressure to evaporate and remove excessive allyl isocyanate and prepare a fluorine-containing polymer (III). As a result of NMR and IR analyses, it was found that the both ends of the trunk chain had been converted from hydroxyl groups to allyl groups. The fluorine-containing polymer (III) had flowability at normal temperature, and its number average molecular weight was 5,400.

EXAMPLE 1

To 100 parts by mass of the n-butyl acetate solution containing 40% by mass of the fluorine-containing polymer (I) and prepared in Synthesis Example 1 were added 4.2 parts by mass of a siloxane compound represented by the average unit formula:

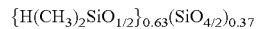

{this amount is one giving 1.0 mole hydrogen atom bonded to silicon atom in this component based on 1 mole of allyl group in the fluorine-containing polymer (I)} and a solution of 1,3-divinyltetramethyldisiloxane complex of platinum in 1,3-divinyltetramethyldisiloxane (in an amount giving 50 ppm of platinum atom based on the mass of the whole composition), and then the mixture was sufficiently mixed. Thus, a curable fluorine-containing polymer composition was prepared.

This curable fluorine-containing polymer composition was coated as a clear coating on an aluminum sheet (JIS H4000A-1050P AM-713) (0.2 mm thick) by Mayer Rod coating, followed by 4-minute drying for curing at 230° C. with a hot air dryer to prepare a coated sheet having a coating thickness of about 20 μm. Pencil hardness, bending property and solvent resistance were evaluated by using this coated sheet. The results are shown in Table 1.

EXAMPLE 2

To 100 parts by mass of the n-butyl acetate solution containing 40% by mass of the fluorine-containing polymer (II) and prepared in Synthesis Example 2 were added 5.0 parts by mass of a siloxane compound represented by the formula:

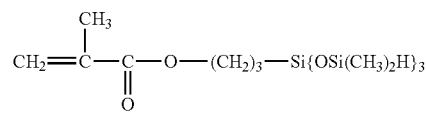

(This amount is one giving 1.0 mole of hydrogen atom bonded to silicon atom in this component based on 1 mole of allyl group in the above-mentioned fluorine-containing polymer (II)) and 1,3-divinyltetramethyldisiloxane solution of 1,3-divinyltetramethyldisiloxane complex of platinum (in such an amount giving 50 ppm of platinum atom based on the mass of the whole composition), and then the mixture was sufficiently mixed. Thus, a curable fluorine-containing polymer composition was prepared.

This curable fluorine-containing polymer composition was coated as a clear coating on an aluminum sheet (JIS H4000A-1050P AM-713) (0.2 mm thick) by Mayer Rod coating, followed by 4-minute drying for curing at 230° C. with a hot air dryer to prepare a coated sheet having a coating thickness of about 20 μm. Pencil hardness, solvent resistance and bending property were evaluated by using this coated sheet. The results are shown in Table 1.

EXAMPLE 3

To 100 parts by mass of the n-butyl acetate solution containing 40% by mass of the fluorine-containing polymer (II) and prepared in Synthesis Example 2 were added 4.4 parts by mass of a siloxane compound represented by the formula:

$$C_6H_5Si\{OSi(CH_3)_2H\}_3$$

{this amount is one giving 1.0 mole of hydrogen atom bonded to silicon atom in this component based on 1 mole of allyl group in the above-mentioned fluorine-containing polymer (II)} and a solution of 1,3-divinyltetramethyldisiloxane complex of platinum in 1,3-divinyltetramethyldisiloxane (in such an amount giving 50 ppm of platinum atom based on the mass of the whole composition), and then the mixture was sufficiently mixed. Thus, a curable fluorine-containing polymer composition was prepared.

This curable fluorine-containing polymer composition was coated as a clear coating on an aluminum sheet (JIS H4000A-1050P AM-713) (0.2 mm thick) by Mayer Rod coating, followed by 4-minute drying for curing at 230° C. with a hot air dryer to prepare a coated sheet having a coating thickness of about 20 μm. Pencil hardness, solvent resistance and bending property were evaluated by using this coated sheet. The results are shown in Table 1.

EXAMPLE 4

To 100 parts by mass of the n-butyl acetate solution containing 40% by mass of the fluorine-containing polymer (II) and prepared in Synthesis Example 2 were added 6.1 parts by mass of a siloxane compound represented by the average unit formula:

$$\{H(CH_3)_2SiO_{1/2}\}_{0.6}\{C_6H_5SiO_{3/2}\}_{0.4}$$

{this amount is one giving 1.0 mole of hydrogen atom bonded to silicon atom in this component based on 1 mole of allyl group in the above-mentioned fluorine-containing polymer (II)} and a solution of 1,3-divinyltetramethyldisiloxane complex of platinum in 1,3-divinyltetramethyldisiloxane (in such an amount giving 50 ppm of platinum atom based on the mass of the whole composition), and then the mixture was sufficiently mixed. Thus, a curable fluorine-containing polymer composition was prepared.

This curable fluorine-containing polymer composition was coated as a clear coating on an aluminum sheet (JIS H4000A-1050P AM-713) (0.2 mm thick) by Mayer Rod coating, followed by 4-minute drying for curing at 230° C. with a hot air dryer to prepare a coated sheet having a coating thickness of about 20 μm. Pencil hardness, solvent resistance and bending property were evaluated by using this coated sheet. The results are shown in Table 1.

EXAMPLE 5

To 100 parts by mass of the n-butyl acetate solution containing 40% by mass of the fluorine-containing polymer (II) and prepared in Synthesis Example 2 were added 4.5 parts by mass of a siloxane compound represented by the formula:

$$C_6H_{13}Si\{OSi(CH_3)_2H\}_3$$

{this amount is one giving 1.0 mole of hydrogen atom bonded to silicon atom in this component based on 1 mole of allyl group in the above-mentioned fluorine-containing polymer (II)} and a solution of 1,3-divinyltetramethyldisiloxane complex of platinum in 1,3-divinyltetramethyldisiloxane (in such an amount giving 50 ppm of platinum atom based on the mass of the whole composition), and then the mixture was sufficiently mixed. Thus, a curable fluorine-containing polymer composition was prepared.

This curable fluorine-containing polymer composition was coated as a clear coating on an aluminum sheet (JIS H4000A-1050P AM-713) (0.2 mm thick) by Mayer Rod coating, followed by 4-minute drying for curing at 230° C. with a hot air dryer to prepare a coated sheet having a coating thickness of about 20 μm. Pencil hardness, solvent resistance and bending property were evaluated by using this coated sheet. The results are shown in Table 1.

COMPARATIVE EXAMPLE 1

To 0.1 g of the fluorine-containing polymer (III) prepared in Synthesis Example 3 and subjected to heat treatment at 180° C. for seven hours were added 0.0157 g of a methylhydrosiloxane/dimethylsiloxane copolymer (trade name: HMS-301, product of GELEST, INC., number average molecular weight: 1,900 to 2,000, methylhydrosiloxane: 25 to 30% by mass based on the copolymer) and 0.0080 g of a 0.06% toluene solution of platinum catalyst [prepared by diluting trade name PT-VTSC-12.0VTS (available from OMG Precious Metals Japan) to 1/200 with toluene], followed by mixing at 50° C. for two hours to prepare a curable fluorine-containing polymer composition.

This curable fluorine-containing polymer composition was coated as a clear coating on an aluminum sheet (JIS H4000A-1050P AM-713) (0.2 mm thick) by Mayer Rod coating, followed by 4-minute drying for curing at 230° C. with a hot air dryer to prepare a coated sheet having a coating thickness of about 20 μm. Pencil hardness, solvent resistance and bending property were evaluated by using this coated sheet. The results are shown in Table 1.

TABLE 1

| Items Characteristics of coating film | Classification | | | | | |
|---|---|---|---|---|---|---|
| | Present Invention | | | | | Comparative Example |
| | Ex. 1 | Ex. 2 | Ex. 3 | Ex. 4 | Ex. 5 | Com. Ex. 1 |
| Pencil hardness | 2H | 2H | 2H | 2H | 2H | 6B |
| Bending property | 1T | 0T | 0T | 0T | 0T | 0T |
| Solvent resistance | 4 | 4 | 4 | 4 | 4 | 4 |

INDUSTRIAL APPLICABILITY

The curable fluorine-containing polymer composition of the present invention is quickly cured at relatively low temperatures by hydrosilylation reaction and provides a coating film having high hardness, excellent solvent resistance and flexibility.

Also, since the obtained cured article has high weather resistance and is excellent in stain-proofing property, chemical resistance, optical properties, mechanical properties, adhesion to a substrate and resistance to thermal yellowing, the composition can be used as a coating, like usual curable compositions, for indoor use for building materials and interior materials and for outdoor use for building materials, automobiles, airplanes, ships and trains by coating it directly on metals, concrete and plastics or by over-coating on undercoats such as wash primer, rust-preventive coating, epoxy coating, acrylic resin coating and polyester resin coating. Further, the composition can be used as a sealing material and a film forming agent.

The invention claimed is:

1. A curable fluorine-containing polymer composition comprising:
   (A) a fluorine-containing polymer comprising repeating units derived from a fluorinated ethylenic monomer and repeating units derived from a non-fluorinated ethylenic monomer, in which a part or the whole of the repeating units derived from the non-fluorinated ethylenic monomer is a repeating unit represented by the formula:

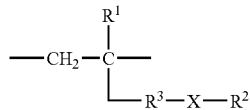

wherein $R^1$ is hydrogen atom or methyl; $R^2$ is alkenyl group, aryl group having alkenyl group, or aralkyl group having alkenyl group; X is a group represented by —C(O)NH—; $R^3$ is a group represented by —O—, —O(CH($R^4$))$_m$O—, —(CH$_2$)$_m$O—, —OC(O)—(CH$_2$)$_n$O— or —(CH$_2$)$_m$OC(O)—(CH$_2$)$_n$O—, where $R^4$ is a group represented by —H, —OH, —CH$_2$OH or —O—X—$R^2$, wherein in the formula, $R^2$ and X are as defined above, "m" is an integer of 1 to 10, and "n" is an integer of 1 to 10, (B) a siloxane compound having hydrogen atom bonded to silicon atom, and
   (C) a catalyst for hydrosilylation reaction,
   wherein the fluorine-containing polymer (A) is a fluorine-containing polymer obtained by reaction of a fluorine-containing polymer (A1) comprising repeating units derived from a fluorinated ethylenic monomer and repeating units derived from a non-fluorinated ethylenic monomer, in which a part or the whole of the repeating units derived from the non-fluorinated ethylenic monomer is a repeating unit represented by the formula (A1):

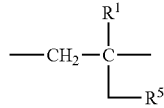

wherein $R^1$ is hydrogen atom or methyl; $R^5$ is a group represented by —OH, —O(CH($R^6$))$_m$OH, —(CH$_2$)$_m$OH, —OC(O)—(CH$_2$)$_n$OH or —(CH$_2$)$_m$OC(O)—(CH$_2$)$_n$OH, wherein in the formula, $R^6$ is a group represented by —H, —OH or —CH$_2$OH, "m" is an integer of 1 to 10, and "n" is an integer of 1 to 10, with a compound represented by the formula:

$R^2$—Y wherein $R^2$ is alkenyl group, aryl group having alkenyl group, or aralkyl group having alkenyl group; Y is a group represented by —NCO,
wherein the fluorine-containing polymer (A1) is obtained by polymerization of a monomer giving the repeating unit of the formula (A1),
wherein the siloxane compound (B) is a siloxane compound (B1) represented by the formula:

wherein $R^{9a}$ is an un-substituted monovalent hydrocarbon group, an organic group having (meth)acryl group or an organic group having epoxy group; $R^{10}$ is a monovalent hydrocarbon group having no ethylenic carbon-carbon double bond or a diorganosilyl group (b2) represented by the formula:

—SiR$^8_2$H wherein $R^8$ is a monovalent hydrocarbon group which has 1 to 10 carbon atoms and does not have ethylenic carbon-carbon double bond;
at least two $R^{10}$s in one molecule are said diorganosilyl groups (b2); "b" is an integer of 1 or 2; or
a siloxane compound (B2) represented by the formula:

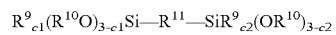

wherein $R^9$ is a substituted or un-substituted monovalent hydrocarbon group, an organic group having (meth)acryl group or an organic group having epoxy group; $R^{10}$ is as defined above; $R^{11}$ is an un-substituted divalent hydrocarbon group; c1 is an integer of 0 to 3; c2 is an integer of 0 to 3; both of c1 and c2 are not 3 at the same time; or a siloxane compound (B3) represented by the average formula:

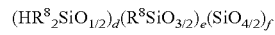

wherein $R^8$ is as defined above; "d" is a positive number; "e" is 0 or a positive number; "f" is 0 or a positive number; d/(e+f) is a number of from 0.5 to 1.9;
when $R^{9a}$ is an un-substituted monovalent hydrocarbon group, the siloxane compound (B1) is at least one selected from the group consisting of CH$_3$(C$_6$H$_5$)Si{OSi(CH$_3$)$_2$H}$_2$, C$_3$H$_7$Si{OSi(CH$_3$)$_2$H}$_3$, C$_4$H$_9$Si{OSi(CH$_3$)$_2$H}$_3$, C$_6$H$_{13}$Si{OSi(CH$_3$)$_2$H}$_3$, C$_8$H$_{17}$Si{OSi(CH$_3$)$_2$H}$_3$, C$_6$H$_5$Si{OSi(CH$_3$)$_2$H}$_3$ and (C$_6$H$_5$)$_2$Si{OSi(CH$_3$)$_2$H}$_2$; and
an amount of hydrogen atom bonded to silicon atom in the siloxane compound (B) is 0.1 to 20 moles based on one mole of the monovalent hydrocarbon group having ethylenic carbon-carbon double bond in the fluorine-containing polymer (A), and an amount of the catalyst (C) for hydrosilylation reaction is a catalytic amount.

2. The curable fluorine-containing polymer composition of claim 1, wherein the repeating unit derived from the fluorinated ethylenic monomer in the fluorine-containing polymer (A) is a repeating unit derived from at least one monomer selected from the group consisting of tetrafluoroethylene, hexafluoropropylene, chlorotrifluoroethylene and trifluoroethylene.

3. The curable fluorine-containing polymer composition of claim 1, wherein the fluorine-containing polymer (A) is a fluorine-containing polymer comprising a repeating unit represented by the formula (1):

—(CF$_2$—CFZ)— wherein Z is a group represented by —H, —Cl, —F or —CF$_3$, a repeating unit represented by the formula (2):

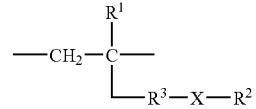

wherein $R^1$ is hydrogen atom or methyl; $R^2$ is alkenyl group, aryl group having alkenyl group, or aralkyl group having alkenyl group; X is a group represented by
—C(O)NH—; $R^3$ is a group represented by —O—, —O(CH($R^4$))$_m$O—, —(CH$_2$)$_m$O—, —OC(O)—(CH$_2$)$_n$O— or —(CH$_2$)$_m$OC(O)—(CH$_2$)$_n$O—, where $R^4$ is a group represented by —H, —OH, —CH$_2$OH or —O—X—$R^2$, wherein in the formula, $R^2$ and X are as defined above, "m" is an integer of 1 to 10, and "n" is an integer of 1 to 10, a repeating unit represented by the formula (3):

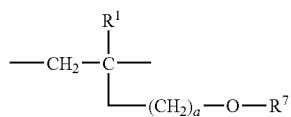

wherein $R^1$ is hydrogen atom or methyl; "a" is 0 or 1; $R^7$ is hydrogen atom or a substituted or un-substituted monovalent hydrocarbon group having no ethylenic carbon-carbon double bond, a repeating unit represented by the formula (4):

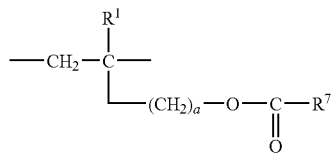

wherein $R^1$ is hydrogen atom or methyl; "a" is 0 or 1; $R^7$ is hydrogen atom or a substituted or un-substituted monovalent hydrocarbon group having no ethylenic carbon-carbon double bond, a repeating unit represented by the formula (5):

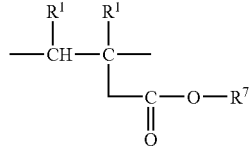

wherein $R^1$s are the same or different and each is hydrogen atom or methyl; $R^7$ is hydrogen atom or a substituted or un-substituted monovalent hydrocarbon group having no ethylenic carbon-carbon double bond, and a repeating unit represented by the formula (6):

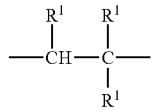

wherein $R^1$s are the same or different and each is hydrogen atom or methyl,
said fluorine-containing polymer is a fluorine-containing polymer comprising 1 to 50% by mole of the repeating unit of the formula (1), 1 to 50% by mole of the repeating unit of the formula (2), 0 to 98% by mole of the repeating unit of the formula (3), 0 to 98% by mole of the repeating unit of the formula (4), 0 to 98% by mole of the repeating unit of the formula (5), and 0 to 98% by mole of the repeating unit of the formula (6), when the amount of the whole repeating units constituting the fluorine-containing polymer (A) is 100% by mole, and
wherein said fluorine-containing polymer comprises at least one of the repeating units represented by formulae (3) to (6).

4. The curable fluorine-containing polymer composition of claim 1, further comprising an optional amount of a solvent (D).

5. The curable fluorine-containing polymer composition of claim 1, which is a coating composition.

6. The curable fluorine-containing polymer composition of claim 1,
wherein the siloxane compound (B) is a siloxane compound (B1) which is at least one selected from the group consisting of CH$_3$(C$_6$H$_5$)Si{OSi(CH$_3$)$_2$H}$_2$, C$_3$H$_7$Si{OSi(CH$_3$)$_2$H}$_3$, C$_4$H$_9$Si{OSi(CH$_3$)$_2$H}$_3$, C$_6$H$_{13}$Si{OSi(CH$_3$)$_2$H}$_3$, C$_8$H$_{17}$Si{OSi(CH$_3$)$_2$H}$_3$, (C$_6$H$_5$)$_2$Si{OSi(CH$_3$)$_2$H}$_2$,
or
a siloxane compound (B2) which is at least one selected from the group consisting of
{(CH$_3$)$_2$HSiO}$_3$Si—C$_2$H$_4$—Si{OSi(CH$_3$)$_2$H}$_3$,
{(CH$_3$)$_2$HSiO}$_3$Si—C$_6$H$_{12}$—Si{OSi(CH$_3$)$_2$H}$_3$,
{(CH$_3$)$_2$HSiO}$_2$CH$_3$Si—C$_2$H$_4$—SiCH$_3${OSi(CH$_3$)$_2$H}$_2$,
{(CH$_3$)$_2$HSiO}$_2$CH$_3$Si—C$_6$H$_{12}$—SiCH$_3$ {OSi(CH$_3$)$_2$H}$_2$,
{(C$_6$H$_5$)$_2$HSiO}$_3$Si—C$_2$H$_4$—Si{OSi(C$_6$H$_5$)$_2$H}$_3$,
{(C$_6$H$_5$)$_2$HSiO}$_3$Si—C$_6$H$_{12}$—Si{OSi(C$_6$H$_5$)$_2$H}$_3$,
{(CH$_3$)$_2$HSiO}$_3$Si—C$_3$H$_6$(OC$_2$H$_4$)$_m$(OC$_3$H$_6$)$_n$ OC$_3$H$_6$—Si{OSi(CH$_3$)$_2$H}$_3$
wherein in the formula, "m" is an integer of 0 or more, "n" is an integer of 0 or more, and "m" and "n" are not 0 at the same time,
or
a siloxane compound (B3) represented by the average formula:

(HR$^8_2$SiO$_{1/2}$)$_d$(R$^8$SiO$_{3/2}$)$_e$(SiO$_{4/2}$)$_f$ wherein $R^8$ is as defined above; "d" is a positive number; "e" is 0 or a positive number; "f" is 0 or a positive number; d/(e+f) is a number of from 0.5 to 1.9.

* * * * *